United States Patent

Mangle

(10) Patent No.: US 11,915,225 B2
(45) Date of Patent: Feb. 27, 2024

(54) MOBILE MERCHANT PAYMENT SYSTEM

(71) Applicant: VISA INTERNATIONAL SERVICE ASSOCIATION, San Francisco, CA (US)

(72) Inventor: Jaydeep Mangle, Banalore (IN)

(73) Assignee: Visa International Service Association, San Francisco, CA (US)

(*) Notice: Subject to any disclaimer, the term of this patent is extended or adjusted under 35 U.S.C. 154(b) by 677 days.

(21) Appl. No.: 16/402,675

(22) Filed: May 3, 2019

(65) Prior Publication Data

US 2020/0349548 A1 Nov. 5, 2020

(51) Int. Cl.
| | |
|---|---|
| *G06Q 20/32* | (2012.01) |
| *G06N 20/00* | (2019.01) |
| *G06Q 20/04* | (2012.01) |
| *G06Q 20/08* | (2012.01) |
| *G06Q 20/14* | (2012.01) |
| *G06Q 30/02* | (2023.01) |
| *G06Q 30/0201* | (2023.01) |
| *G06Q 30/0283* | (2023.01) |
| *G07B 15/02* | (2011.01) |

(Continued)

(52) U.S. Cl.
CPC ....... *G06Q 20/3224* (2013.01); *G06Q 20/047* (2020.05); *G06Q 20/085* (2013.01); *G06Q 30/0206* (2013.01); *G06Q 30/0284* (2013.01); *G07B 15/02* (2013.01); *H04W 4/021* (2013.01); *H04W 4/029* (2018.02); *G06N 20/00* (2019.01)

(58) Field of Classification Search
CPC ............. G06Q 20/3224; G06Q 20/047; G06Q 30/0206; G06Q 30/0284; G06Q 20/085; G06Q 20/145; G07B 15/02; H04W 4/021; H04W 4/029; G06N 20/00
USPC ......................................................... 705/13
See application file for complete search history.

(56) References Cited

U.S. PATENT DOCUMENTS

| 10,332,162 B1* | 6/2019 | Brock ................ G06Q 30/0284 |
| 2007/0210936 A1* | 9/2007 | Nicholson .............. G08G 1/123 340/988 |

(Continued)

OTHER PUBLICATIONS

Repetski, Stephen; "Metro Reasons: Metro hopes to bring mobile and phone payments by 2019"; https://ggwash.org/view/67294/metro-reasons-metro-hopes-to-bring-mobile-and-phone-payments-by-2019; Apr. 17, 2018. (Year: 2018).*

*Primary Examiner* — Resha Desai
*Assistant Examiner* — Dione N. Simpson
(74) *Attorney, Agent, or Firm* — K&L Gates LLP

(57) ABSTRACT

A mobile merchant may have an entrance area which may have a geo-fence area which has a communication device to communicate with a payment device of a user when in or passing through the geo-fence area such as getting on a bus. The location of the start of the communication may be noted and stored as a first or starting location. When the user gets off the mobile merchant, the communication between the communication device and the payment device may end. The location of the end of the communication may also be noted and stored as a second or ending location. The first and second location and data from the payment device may be communicated to a billing computing device which may determine a price for the trip from the first location and the second location and the price may be applied to the payment account represented by the payment data.

14 Claims, 9 Drawing Sheets

(51) Int. Cl.
*H04W 4/02* (2018.01)
*H04W 4/021* (2018.01)
*H04W 4/029* (2018.01)

(56) References Cited

U.S. PATENT DOCUMENTS

| | | | |
|---|---|---|---|
| 2012/0209773 A1* | 8/2012 | Ranganathan | G06Q 20/3224 |
| | | | 705/44 |
| 2014/0343850 A1* | 11/2014 | Faaborg | G01C 21/3655 |
| | | | 701/537 |
| 2016/0379141 A1* | 12/2016 | Judge | G06Q 50/30 |
| | | | 705/5 |
| 2017/0352125 A1* | 12/2017 | Dicker | G06Q 50/30 |
| 2019/0019362 A1* | 1/2019 | Gravelle | H04W 4/80 |

* cited by examiner

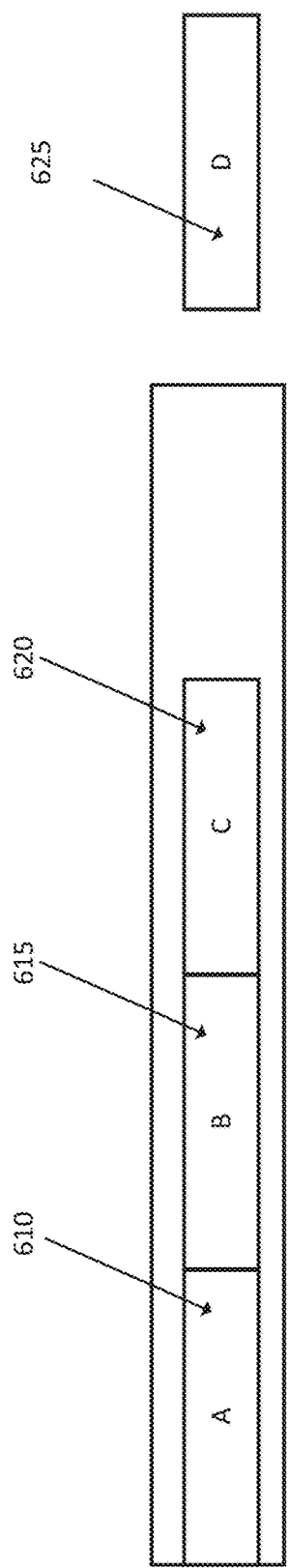
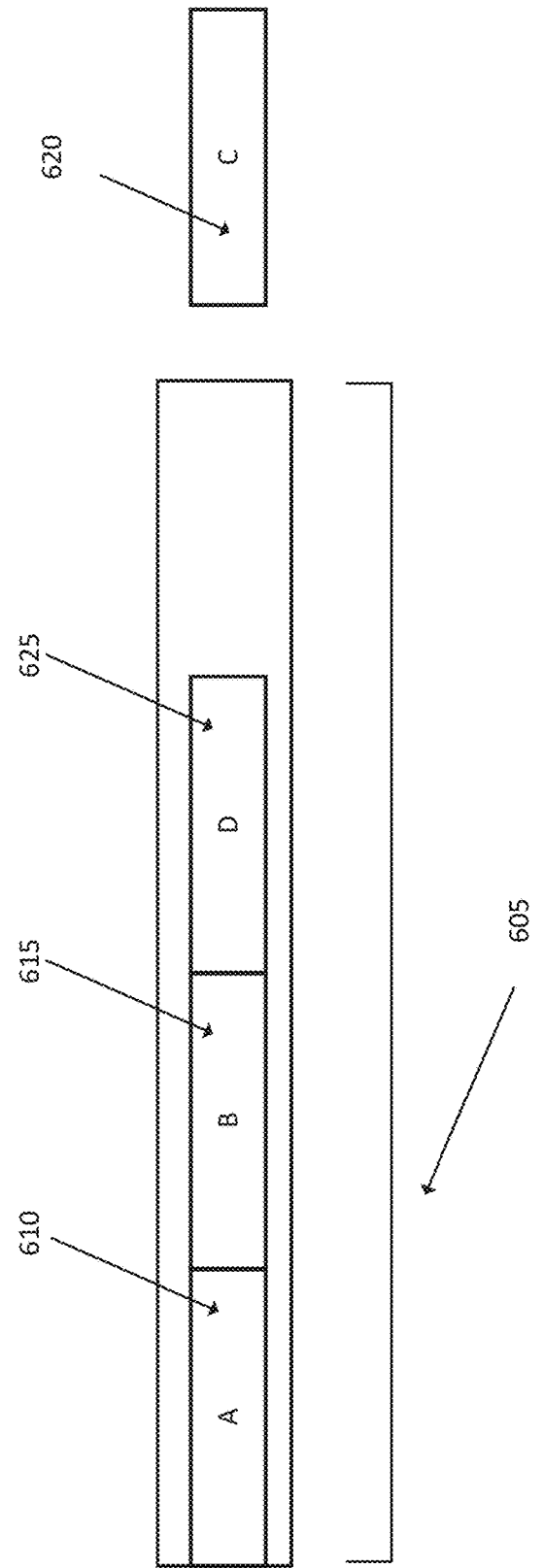
FIG. 6B
FIG. 6C

MOBILE MERCHANT PAYMENT SYSTEM

BACKGROUND

Many areas of the economy have been transformed by improved methods of communicating transaction or payment data. The underlying idea is that by removing hurdles or challenges in making electronic payments, payments may be easier which may benefit both consumers and merchants. Concepts such as payment devices with magnetic stripes may have made communicating the payment details faster and more accurate. Similarly, payment devices with electronic chips have further reduced fraud and more accurately communicated payment information. Finally, near field communication has made it possible for transaction information to be obtain by merely waving payment devices near another near field communication device. However, certain merchants have not benefitted in the same easy way as store front merchants.

SUMMARY

In the described system and method, wireless communication may be used to ease payments on mobile merchants such as buses, light rail trains, subway trains, or other publically accessible transportation. A mobile merchant may have an entrance area which may have a geo-fence area which has a communication device to communicate with a payment device of a user when in or passing through the geo-fence area such as getting on a bus. The location of the start of the communication may be noted and stored as a first or starting location. When the user gets off the mobile merchant, the communication between the communication device and the payment device may end. The location of the end of the communication may also be noted and stored as a second or ending location. The first and second location and data from the payment device may be communicated to a billing computing device which may determine a price for the trip from the first location and the second location and the price may be applied to the payment account represented by the payment data.

BRIEF DESCRIPTION OF THE DRAWINGS

FIG. 6b may be an illustration of training data and testing data;

FIG. 6c may be an illustration of training data and testing data; and

SPECIFICATION

The present system, method and tangible memory device now will be described more fully with reference to the accompanying drawings, which form a part hereof, and which show, by way of illustration, specific exemplary embodiments by which the system, method and tangible memory device may be practiced. These illustrations and exemplary embodiments are presented with the understanding that the present disclosure is an exemplification of the principles of one or more system, method and tangible memory devices and is not intended to limit any one of the system, method and tangible memory devices to the embodiments illustrated. The system, method and tangible memory device may be embodied in many different forms and should not be construed as limited to the embodiments set forth herein; rather, these embodiments are provided so that this disclosure will be thorough and complete, and will fully convey the scope of the system, method and tangible memory device to those skilled in the art. Among other things, the present system, method and tangible memory device may be embodied as methods, systems, computer readable media, apparatuses, components, or devices. Accordingly, the present system, method and tangible memory device may take the form of an entirely hardware embodiment, an entirely software embodiment, or an embodiment combining software and hardware aspects. The hardware may be local, may be remote or may be a combination of local and remote. The following detailed description is, therefore, not to be taken in a limiting sense.

At a high level, a mobile merchant may have an entrance area which may have a geo-fence area which has a communication device to communicate with a payment device of a user when in or passing through the geo-fence area such as getting on a bus. The location of the start of the communication may be noted and stored as a first or starting location. When the user gets off the mobile merchant, the communication between the communication device and the payment device may end. The location of the end of the communication may also be noted and stored as a second or ending location. The first and second location and data from the payment device may be communicated to a billing computing device which may determine a price for the trip from the first location and the second location and the price may be applied to the payment account represented by the payment data.

Figure 1:
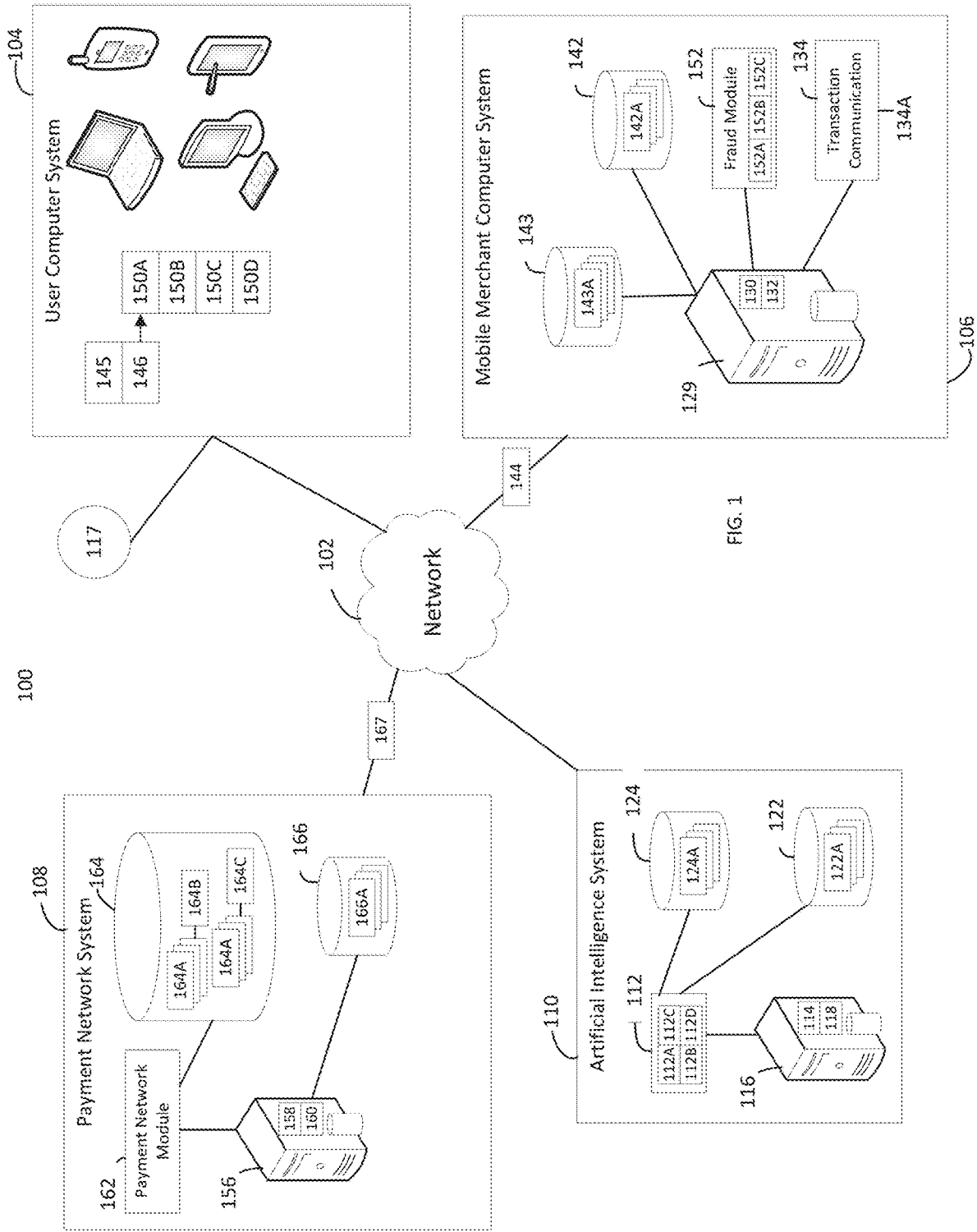
FIG. 1 may be an illustration of a sample payment network.

Referring to FIG. 1 which generally illustrates one embodiment of a private network such as a payment system used by the mobile merchant 106. The system 100 may include a computer network 102 that links one or more systems and computer components. In some embodiments, the system 100 includes a user computer system 104, a mobile merchant computer system 106, a payment network system 108, and a transaction analysis system which may embody artificial intelligence 110.

The network 102 may be described variously as a communication link, computer network, internet connection, etc. The system 100 may include various software or computer-executable instructions or components stored on tangible memories and specialized hardware components or modules that employ the software and instructions to identify related transaction nodes for a plurality of transactions by monitoring transaction communications between users 550 and merchants.

The various modules may be implemented as computer-readable storage memories containing computer-readable instructions (i.e., software) for execution by one or more processors of the system 100 within a specialized or unique computing device. The modules may perform the various tasks, methods, blocks, sub-modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks generally facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A user computer system 104 may include a processor 145 and memory 146. The user computing system 104 may include a server, a mobile computing device, a smartphone, a tablet computer, a Wi-Fi-enabled device, wearable computing device or other personal computing device capable of wireless or wired communication, a thin client, or other known type of computing device. The memory 146 may include various modules including instructions that, when executed by the processor 145 control the functions of the user computer system generally and integrate the user computer system 104 into the system 100 in particular. For example, some modules may include an operating system 150A, a browser module 150B, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 108. In some embodiments, a responsible party 117 is in communication with the user computer system 104.

In some embodiments, a module of the user computer system 104 may pass user payment data to other components of the system 100 to facilitate determining a real-time transaction analysis determination. For example, one or more of the operating system 150A, a browser module 150B, a communication module 150C, and an electronic wallet module 150D may pass data to a mobile merchant computer system 106 and/or to the payment network system 108 to facilitate a payment transaction for a good or service. Data passed from the user computer system 104 to other components of the system may include a customer name, a customer ID (e.g., a Personal Account Number or "PAN"), address, current location, and other data.

The mobile merchant computer system 106 may include a computing device such as a merchant server 129 including a processor 130 and memory 132 including components to facilitate transactions with the user computer system 104 and/or a payment device via other entities of the system 100. In some embodiments, the memory 132 may include a transaction communication module 134. The transaction communication module 134 may include instructions to send mobile merchant messages 134A to other entities (e.g., 104, 108, 110) of the system 100 to indicate a transaction has been initiated with the user computer system 104 and/or payment device including payment device data and other data as herein described. The mobile merchant computer system 106 may include a merchant transaction repository 142 and instructions to store payment and other merchant transaction data 142A within the transaction repository 142A. The merchant transaction data 142A may only correspond to transactions for products with the particular merchant or group of merchants having a merchant profile (e.g., 164B, 164C) at the payment network system 108.

The mobile merchant computer system 106 may also include a product repository 143 and instructions to store product data 143A within the product repository 143. For each product offered by the mobile merchant computer system 106, the product data 143A may include a product name, a product UPC code, an item description, an item category, an item price, a number of units sold at a given price, a merchant ID, a merchant location, a customer location, a calendar week, a date, a historical price of the product, a merchant phone number(s) and other information related to the product. In some embodiments, the mobile merchant computer system 106 may send merchant payment data corresponding to a payment device to the payment network system 108 or other entities of the system 100, or receive user payment data from the user computer system 104 in an electronic wallet-based or other computer-based transaction between the user computer system 104 and the mobile merchant computer system 106.

The mobile merchant computer system 106 may also include a fraud module 152 having instructions to facilitate determining fraudulent transactions offered by the mobile merchant computer system 106 to the user computer system 104. Fraud may occur in many forms from using fraudulent physical cards to fraudulent account numbers to false or misleading communication signals. The fraud API 152A may include instructions to access one or more backend components (e.g., the payment network system 108, the artificial intelligence engine 110, etc.) and/or the local fraud module 152 to configure a fraud graphical interface 152B to dynamically present and apply the transaction analysis data 144 to products or services 143A offered by the merchant computer system 106 to the user computer system 104. A merchant historical fraud determination module 152C may include instructions to mine merchant transaction data 143A and determine a list of past fraudulent merchants to obtain historical fraud information on the merchant.

The payment network system 108 may include a payment server 156 including a processor 158 and memory 160. The memory 160 may include a payment network module 162 including instructions to facilitate payment between parties (e.g., one or more users 550, merchants, etc.) using the payment system 100. The module 162 may be communicably connected to an account holder data repository 164 including payment network account data 164A.

The payment network account data 164A may include any data to facilitate payment and other funds transfers between system entities (e.g., 104, 106). For example, the payment network account data 164A may include account identification data, account history data, payment device data, etc. The module 162 may also be communicably connected to a payment network system transaction repository 166 including payment network system global transaction data 166A.

The global transaction data 166A may include any data corresponding to a transaction employing the system 100 and a payment device. For example, the global transaction data 166A may include, for each transaction across a plurality of merchants, data related to a payment or other transaction using a PAN, account identification data, a product or service name, a product or service UPC code, an item or service description, an item or service category, an item or service price, a number of units sold at a given price, a merchant ID, a merchant location, a merchant phone number(s), a customer location, a calendar week, and a date, corresponding to the product data 143A for the product that was the subject of the transaction or a merchant phone number. The payment module 162 may also include instructions to send payment messages 167 to other entities and components of the system 100 in order to complete transactions between users 550 of the user computer system 104 and merchants of the mobile merchant computer system 106 who are both account holders within the payment network system 108.

The artificial intelligence or machine learning engine 110 may include one or more instruction modules including a transaction analysis module 112 that, generally, may include instructions to cause a processor 114 of a transaction analysis server 116 to functionally communicate with a plurality of other computer-executable steps or sub-modules, e.g., sub-modules 112A, 112B, 112C, 112D and components of the system 100 via the network 102. These modules 112A, 112B, 112C, 112D may include instructions that, upon loading into the server memory 118 and execution by one or more computer processors 114, dynamically determine transaction analysis data for a product 143A or a mobile merchant computer system 106 using various stores of data 122A, 124A in one more databases 122, 124. As an example, sub-module 112A may be dedicated to dynamically determine transaction analysis data based on transaction data associated with a mobile merchant 106. The operation and application of the machine learning engine 110 may be further described in relation to FIGS. 6a, 6b and 6c.

Figure 2:
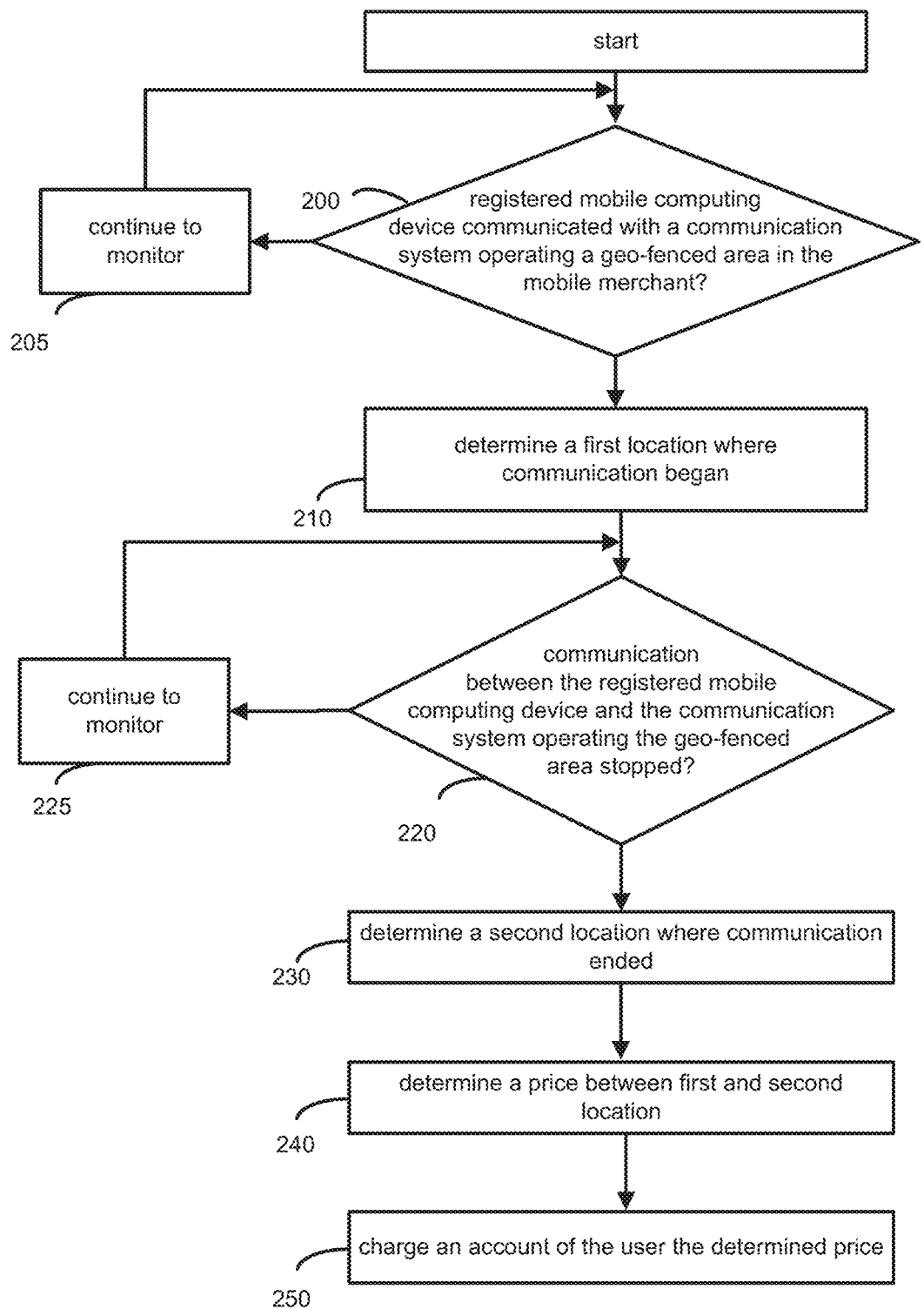
FIG. 2 may be a flowchart of a payment method for mobile merchants.

FIG. 2 may illustrate a sample method that may physically configure a processor as part of the system. The method may be a method of providing payment to a mobile merchant 106 from a user 550. At a high level, a mobile merchant 106 may be a transportation device such as a bus, light rail, subway, train or any other publically available transportation system. Traditionally, transportation devices have accepted change, monetary bills or transit cards issued by the transit agency. In some advanced systems, transit agencies may have transit system specific computing applications which may communicate with purpose built payment terminals on the transit device. However, many users 550 may prefer the simplicity of using a traditional payment application such as a payment device with near field communication (NFC) capabilities or a wallet application rather than a transit company specific payment application.

At block 200, the system or method may determining whether wireless communication with a mobile computing device 320 registered to the user 550 has communicated with a communication system operating a geo-fenced area in the mobile merchant 106. The determination may be as simple as whether a signal from the users 550 mobile computing device 320 has been received by the communication device on the mobile merchant 106. In other embodiments, an app may have to register with the communication system on the mobile merchant 106. In some embodiments, the app may have to have been pre-registered with the mobile merchant 106 and in other embodiments, the app may be set up while in communication with the communication system on the mobile merchant 106.

A mobile computing device 320 may be an electronic device that is capable of executing computer executable code and may have wireless communication capabilities in a variety of frequencies. It also may have a portable power source such as a battery. The computing device 901 in FIG. 7 may be a detailed illustration of a sample mobile portable computing device 320. An example may be a smart phone such as an iPhone by Apple or a smart phone from Samsung. In other embodiments, the mobile computing device 320 may be a wearable device such as a ring, a necklace, a bracelet, a piece of clothing with computing capabilities, etc.

In some embodiments, the mobile computing device 320 may be on or in a standby state. The mobile computing device 320 may periodically push a signal to register with the transaction communication module which may also be called a payment communication system 134. In other embodiments, the mobile computing device 320 may wait to receive a signal from the communication system and may then respond. In other embodiments, the mobile computing device 320 may be in a sleep type state and may be awoken by the communication system 134 and may begin communications when in range of the communication system 134. In some embodiments, the mobile computing device 320 may use energy from the communication system 300 as an energy source and may respond when sufficient energy is received from the communication system 134.

A communication system 134 on the mobile merchant 106 may be a device that communicates wirelessly with other devices. It may operate in a variety of frequencies to be able to communicate with a variety of portable computing devices. It also may store and operate according to a variety of protocols in order to obtain the needed transaction data in an efficient manner.

A geo-fenced area may be an area of the mobile merchant 106 that receives signals from the communication system in a strength sufficient to enable transaction data to be communicated efficiently and with minimal errors. In some embodiments, electronic fences may be used to ensure the signals stay within a predefined area. The predefined area may be marked on the mobile merchants 106 such that users 550 may know they are entering or leaving a geo-fenced payment area.

Figure 3:
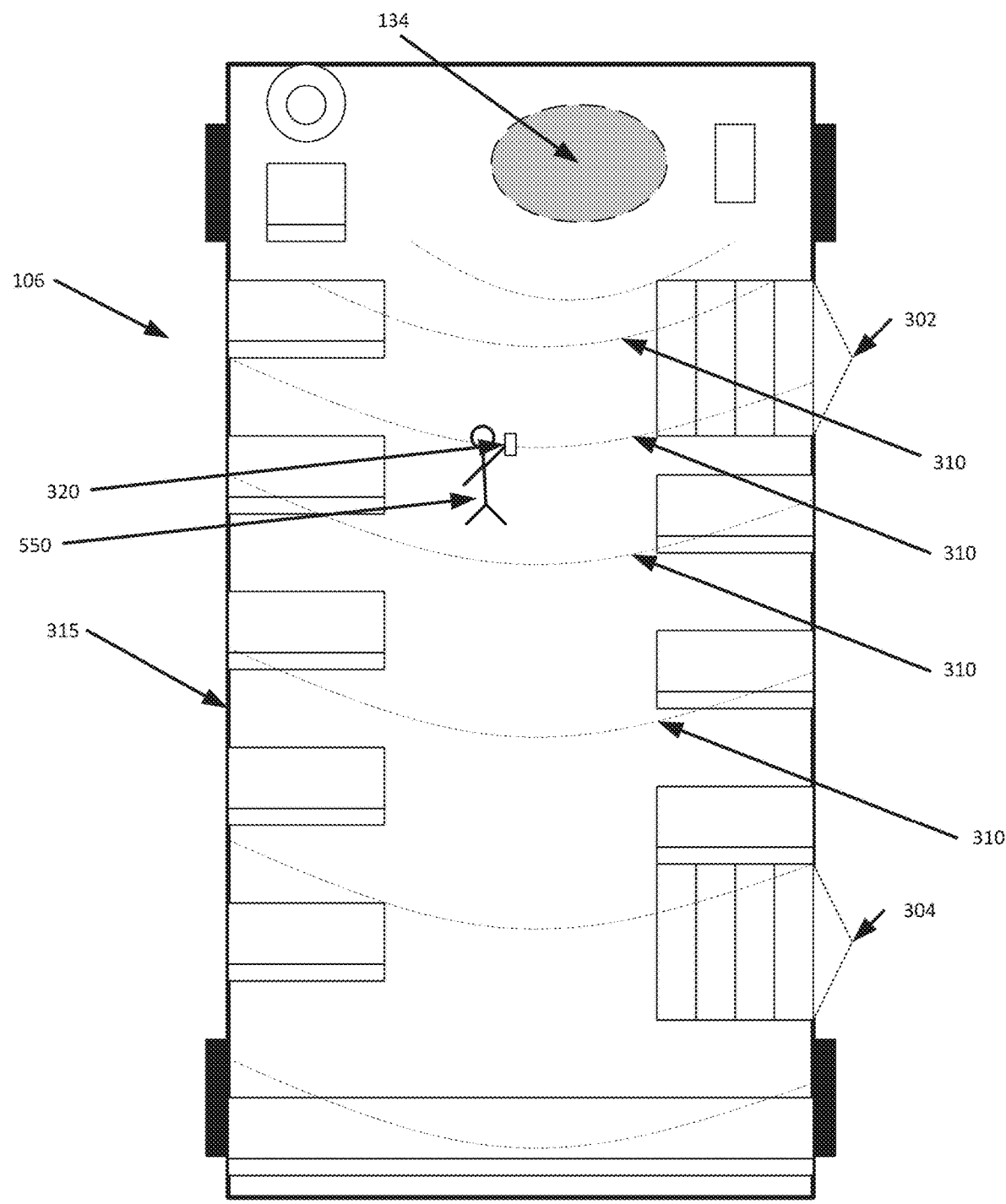
FIG. 3 may be a map view of a mobile merchant payment system.

FIG. 3a may be a block view of a sample mobile merchant 106. The mobile merchant 106 may have a first door or entrance 302 and a second door or exit 304. The mobile merchant 106 may have a communication system 134. The communication system 134 may create a wireless communication signal 310 which may be contained in a geo-fenced area 315 such as the interior of a bus or a light rail car. In one embodiment, there may be a single wireless communication device in the communication system 134 and in other embodiments, there may be multiple wireless communication devices which are part of the communication system

134. For example, if the mobile merchant 106 is a long train cars with doors 302 and 304 which are far from each other, multiple wireless communication devices may be needed as part of the communication system 134 to make sure both the first door 302 and second door 304 are receiving sufficient wireless communication signals 310 to communication with the user's wireless communication device 320 when a user 550 enters or leaves a mobile merchant 106.

If communication between the mobile computing device 320 and communication system 134 is not created, at block 205 (FIG. 2), the method may return back to block 200 to wait for a communication session to be established.

Referring to FIG. 2, if communication between the mobile computing device 320 and mobile merchant computer system 106 is not created, the system may continue to monitor for communications at block 205. If communication between the mobile computing device 320 and mobile merchant computer system 106 is created, at block 210 in response to determining that wireless communication with the mobile computing device 320 registered to the user 550 has communicated with the mobile merchant computer system 106 operating the geo-fenced area 315 in the mobile merchant 106, a first location 505 of the mobile computing device 320 may be determined. The first location 505 may be indicated by first location data representing a first site the mobile computing device 320 registered to the user 550 communicated with the communication system operating the geo-fenced area in the mobile merchant 106.

In use, a user 550 with a smart phone 320 may enter the mobile merchant 106 which may be a bus. The bus entrance may have a geo-fenced area 315 and communication between the communication device 134 on the bus 106 and the smart phone 320 of the user 550 may begin. The location of the bus 106 may be noted as the first location 505 using GPS signals of the bus 106 or the mobile computing device 320 or of other electronic locations which the bus 106 may pass.

In some embodiments, a first time 510 may be determined where the first time 510 is when the wireless communication begins between the mobile computing device 320 registered to the user 550 and the communication system operating the geo-fenced area 315 on the mobile merchant 106. In use, the time may be noted when the user 550 with a mobile computing device 320 enters the geo-fenced area 315 of the bus 106 and communication may begin.

The first time 510 may also be used to determining the first location which may be a site of the mobile computing device 320 or the mobile merchant 106 at the first time 510. The location of the bus may be noted using GPS signals of the bus or the mobile computing device 320 or of other electronic locations which the bus may pass and the first time 510 may be used to establish a location at a point in time.

At block 220, the system may determine whether communication between the mobile computing device 320 registered to the user 550 and the communication system operating 134 the geo-fenced area has stopped. In use, when a user 550 leaves the geo-fenced area, the system may assume the user 550 has left the mobile merchant 106 (for example, a bus) and the trip has ended.

At block 225, if communication continues, the communication may continue to be monitored. In other words, the user 550 and the payment device may still be in the geo-fenced area and communication may continue between the payment device 320 and the communication system 134 such as when the commuter is still riding a bus.

At block 230, in response to determining that communication between the mobile computing device 320 registered to the user 550 and the communication system 134 operating the geo-fenced area has stopped, a second location 515 may be determined by storing second location data representing a second site where wireless communication with the mobile computing device 320 registered to the user 550 and the communication system operating the geo-fenced area in the mobile merchant 106 has ended. In use, the time may be noted when the user 550 with a mobile computing device 320 leaves the geo-fenced area of the bus and communication may end and it may be stored as the second time 520.

In some embodiments, the second time 520 may be determined when wireless communication ends between the mobile computing device 320 registered to the user and the communication system operating the geo-fenced area. The second time 520 may also be used to determining a site of the mobile computing device 320 or the mobile merchant 106 at the second time. The location of the bus may be determined in a variety of ways. For example GPS signals of the bus or the mobile computing device 320 or of other electronic locations which the bus may pass and the second time may be used to establish a location at a point in time. In addition, other wireless communication channels may be used to determine the location of the mobile merchant 106. In some other embodiments, sensors in the pavement may be used to sense the location of a mobile merchant 106. In another embodiment, the location may be determined by monitoring cameras that are pointed at the path of the bus. And in some embodiments, humans may be used to spot and report the location of the bus.

At block 240, a price for traveling from the first location to the second location may be determined. The price may be set according to a schedule. In some embodiment, some users 550 may pay a different price than other users 550. For example, senior citizens may pay a first price, students a second price and general traffic may pay a third price. The various prices may be determined by the method. In some embodiments, the price may be determined based on the first time and the second time. For example, public transit may be more expensive during the morning commute or the evening commute. Similarly, the price may be further determined based on a level of demand during a time period between the first time and the second time. For example, if a parade falls on a Sunday, prices may traditionally be lower, but demand may be high due to the parade. A higher price may reflect the higher demand.

Figure 4:
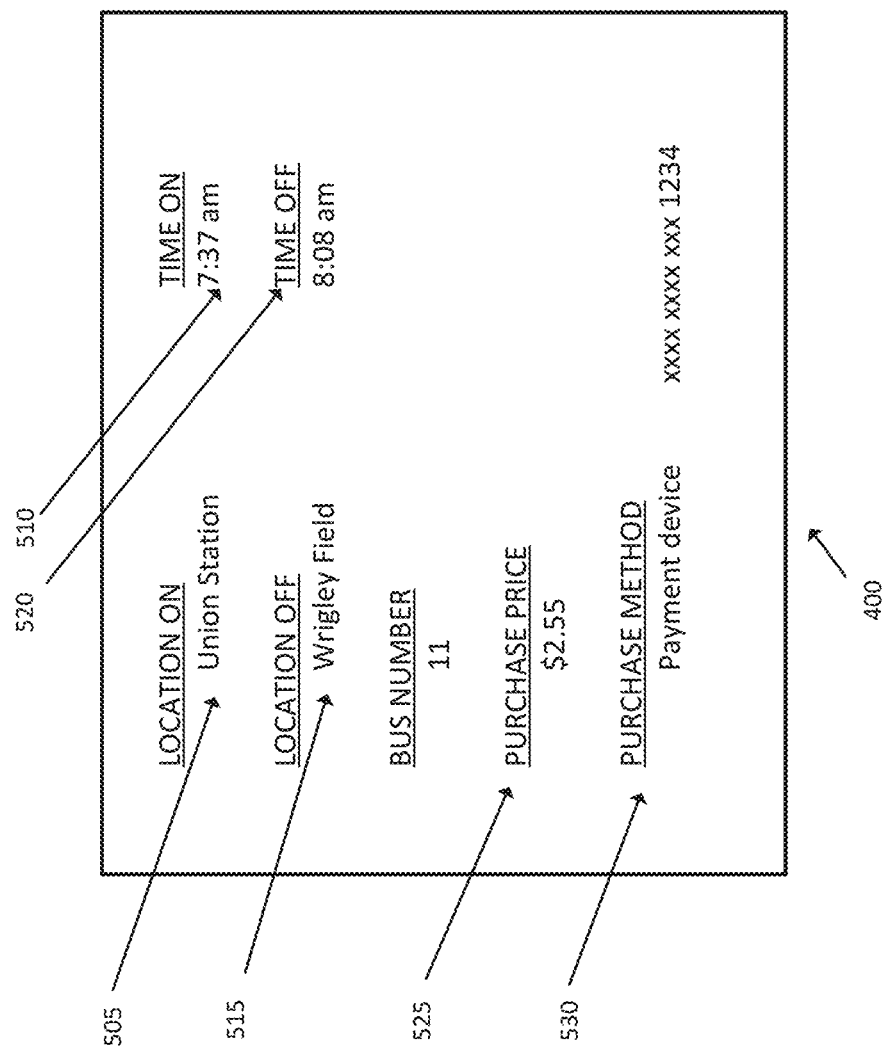
FIG. 4 may be a user interface presented to a user for a sale.

A block 250, an account of the user 550 may be charged the determined price 525. In some embodiments, the account may be a payment account separate from the mobile merchant 106. For example, the payment account 530 may be a traditional credit account like a Visa account. In addition, a receipt 400 such as the receipt in FIG. 4 may be communicated to the user 550 when the account has been charged. The receipt 400 may take on a variety of forms such as the form in FIG. 4. For example, it could be a text message, an email, an app notification, etc. Logically, the monetary value may be transferred from the payment account to the mobile merchant 106 using the payment services illustrated in FIG. 1.

Figure 5A:
FIG. 5a may be an illustration of a mobile merchant on a map.

FIG. 5a may be map view of a possible mobile merchant 106 moving through a path. The first time 510 may be illustrated with a clock near the first location 505 where a user 550 may enter a mobile merchant 106 such as a bus. The mobile merchant 106 may communicate with a purchase device such as a smart phone of the user 550 once the user 550 enters the bus. The communication may continue until the bus reaches the second location 515. At the second time 520, the user 550 may exit the bus and the communication between the mobile merchant 106 and the user payment device such as the smart phone 320 of the user 550 may stop. An amount may be determined and the user 550 may be billed for the trip. A receipt may be communicated indicating the amount of the trip along with the starting point and the ending point.

Another embodiment, there may be multiple communication systems on the bus. One communication system may cover an entrance creating a first geo-fenced area and another may cover an exit creating a second geo-fenced area. In yet another embodiment, one system may cover the inside of a bus creating a first geo-fenced area and a second system may cover the outside of a bus creating a second geo-fenced area. By using multiple geo-fenced areas, false reading may be minimized.

Another aspect of the system may be in reducing fraud. For example, a user 550 may enter a bus without any way to pay the fare. An authority may be alerted when the user 550 does not have the mobile computing device 320 and has entered the geo-fenced area, traveled with the mobile merchant 106 and has left the geo-fenced area. In some embodiments, the mobile merchant 106 may have video surveillance and the video surveillance may be marked at the first time and the second time such that the video may be reviewed to identify the fraudster.

In yet another aspect, the location of the mobile merchant 106 and the location of the user's mobile computing device 320 may compared to determine if the user 550 actually did use the mobile merchant 106 or if there was an error in the system. For example, a user 550 may stand near a bus and the payment sensor may communicate with the user's mobile computing device 320. However, the user 550 may not get on the bus and thus the user 550 logically should not be charged.

In execution, a third location may be determined where the third location comprises a determined third site of the user's mobile computing device 320 at the first time. The third location may be determined in a variety of manners. In one embodiment, the Global Positioning System (GPS) location of the mobile computing device 320 may be made available to the system with the permission of the user 550. In other embodiments, the cell towers a mobile communication device may communicate with may be collected and the known location of the cell towers may be used to determine the third location. In yet another embodiment, the mobile communication device may communicate with wifi access points and the known locations of the wifi points may be used to determine the third location. Of course, additional manners of determining the location of the portable communication device at the first time may be possible and are contemplated.

As mentioned previously, the first site may be the determined start of a trip and the first time may be when the user's communication device 320 begins to communicate with the transaction communication device which may be thought of as a payment sensor 134. A fourth location may be determined where the fourth location may be a determined fourth site of the user mobile computing device 320 at the second time. As mentioned previously, the second time 520 may be when the user's mobile computing device 320 stops communicating with the transaction communication module 134 and the second time may be when the when the user's communication device 320 ends communication with the transaction communication module 134. In addition, the fourth location may be determined using the similar manners of determining the third location.

The second location (for example, the location of the bus) 515 may be compared to the fourth location (for example, the location of the user's mobile computing device 320) at the second time 520 (when communication stopped between the payment sensor and the user's communication device 320). In response to the second location 515 not being substantially similar to the fourth location (not shown), the user 550 may not be charged as the system may assume the user 550 did not actually use the mobile merchant 106. In response to the second location 515 being substantially similar to the fourth location, the user 550 may be charged.

In yet another embodiment, velocity or change in velocity (acceleration) may be used to determine if a user 550 is on the mobile merchant 106. The velocity of the mobile merchant 106 may be determined at a one or more points in time. The velocity of the mobile computing device 320 of the user 550 may also be determined at the same points in time. If the velocity of the mobile merchant 106 and the velocity of the mobile computing device are within a threshold of each other, it may be assumed that the user 550 is on the mobile merchant 106 and should be charged.

For example, at a third point in time, the mobile merchant 106 and mobile computing device 320 may both be traveling at a consistent 30 miles per hour making the difference below a threshold of 5 percent. In addition, the acceleration of the mobile merchant 106 and mobile computing device 320 may both be 0 which also may be below a threshold. Similarly, at a fourth point in time, the velocity of the mobile merchant 106 may be 11 miles per hour and the velocity of the mobile computing device 320 may be 11 miles per hour with the resulting difference being below a threshold. Related, at the fourth point in time, the acceleration of the mobile merchant 106 may be 15 miles per second squared and the acceleration of the mobile computing device 320 may be 14 miles per second squared and the difference may be below a threshold as the swaying of the mobile computing device 320 may cause a difference in acceleration. As the velocity and acceleration are below the threshold, the system may assume the user 550 is on the mobile merchant 106 and should be charged.

Figure 5B:
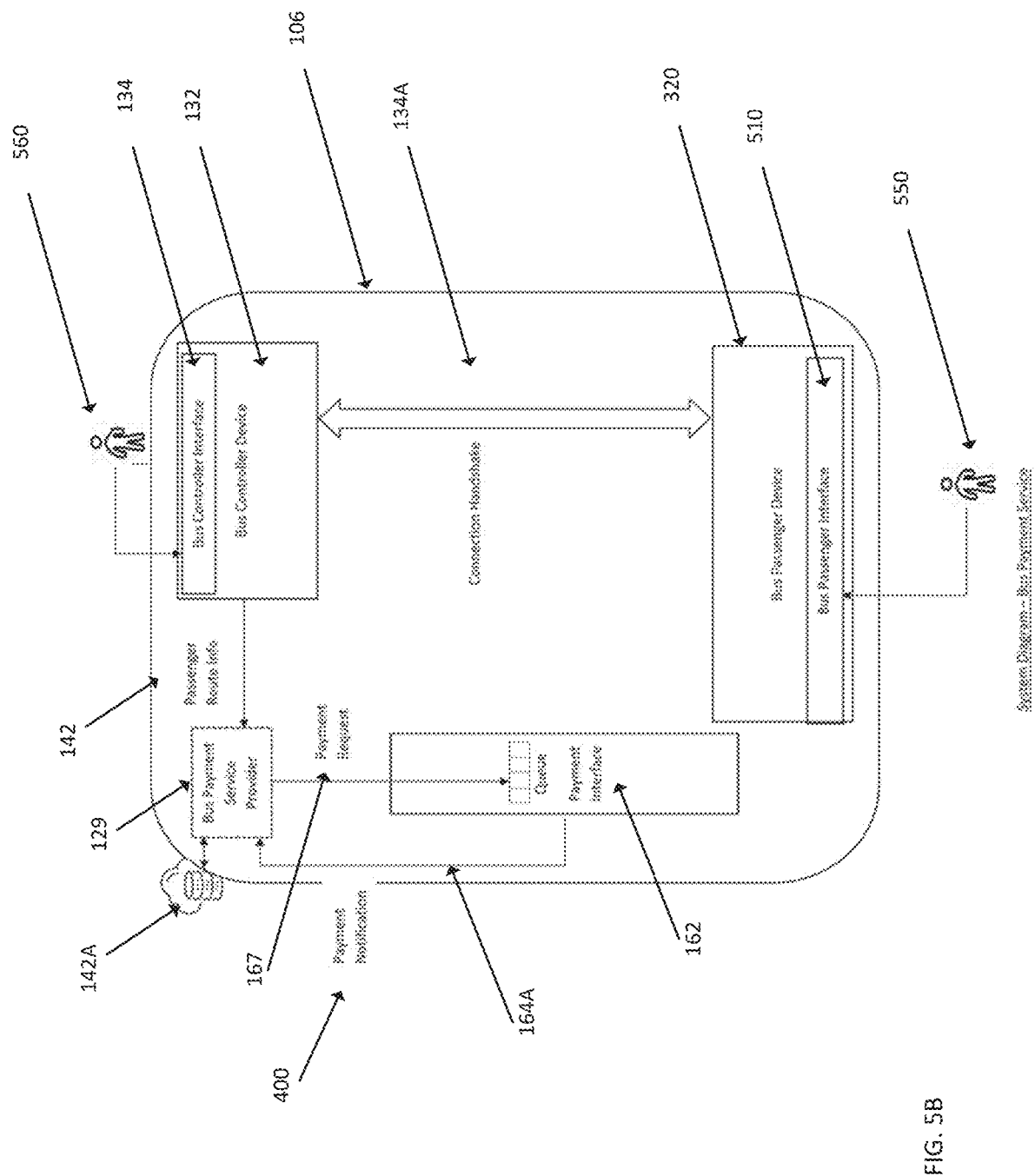
FIG. 5b may be an illustration of a payment process flow using a mobile merchants.

Finally, in another situation, at the third point in time, the mobile merchant 106 may be traveling at 25 miles per hour and mobile computing device 320 may be traveling at a consistent 3 miles per hour making the difference above a threshold of 5 percent. Similarly, at a fourth point in time, the velocity of the mobile merchant 106 may be 11 miles per hour and the velocity of the mobile computing device 320 may be 3 miles per hour with the resulting difference being above a threshold, indicating the user 550 and the user's computing device 320 is likely not on the mobile merchant 106 and should not be charged. The threshold may be set by an authority and may be adjusted over time as additional data FIG. 5B may illustrate a possible payment flow on a mobile merchant 106. A user 550 may enter a mobile merchant 106 which may be, for example and not a limitation, a bus. The user 550 may have a mobile computing device 320 which may have a user interface. The user interface may indicate to the user 550 that the user 550 may have entered a geo-fenced area and communication 134A may begin between the payment system 132 on the bus 106. The driver 560 of the bus may also have a user interface from the transaction communication module 134 which may indicate that a new rider has entered, the user 550 has an appropriate device 320 to make a payment or that a device does not have the required credentials to pay the mobile merchant 106.

Merchant transaction data 142 which may be in the form of route details may be communicated to a merchant server which may be in the form of a business payment service provider 129 which may access a database of payment information 142A which may be useful in determining prices or likely route details to verify a ride is actually occurring. Payment messages or requests 167 may be communicated to a payment system 162 and the payment notification 400 may be communicated through the system to the user 550.

Machine learning may be used to assist in determine when a user 550 has taken an actual trip on a mobile merchant 106 and when a user 550 is merely standing near a mobile merchant 106 when it passes bye. For example, a smart phone may communicate with a bus that is stopped at a stop light. However, the user 550 may not get on the bus. Machine learning may be used to review a training group of data related to users 550 communicating with the mobile merchant 106 to better determine which communications were false positives, which were short trips and which were longer trips.

Logically, the location of the mobile merchant 106, the location of the mobile computing device 320, the velocity of the mobile merchant 106, the velocity of the mobile computing device 320, the time of entrance into the geo-fenced area and the time of the exit from the geo-fenced area may all be used in various combinations to verify that the user 550 should be charged for using the mobile merchant 106.

Figure 6A:
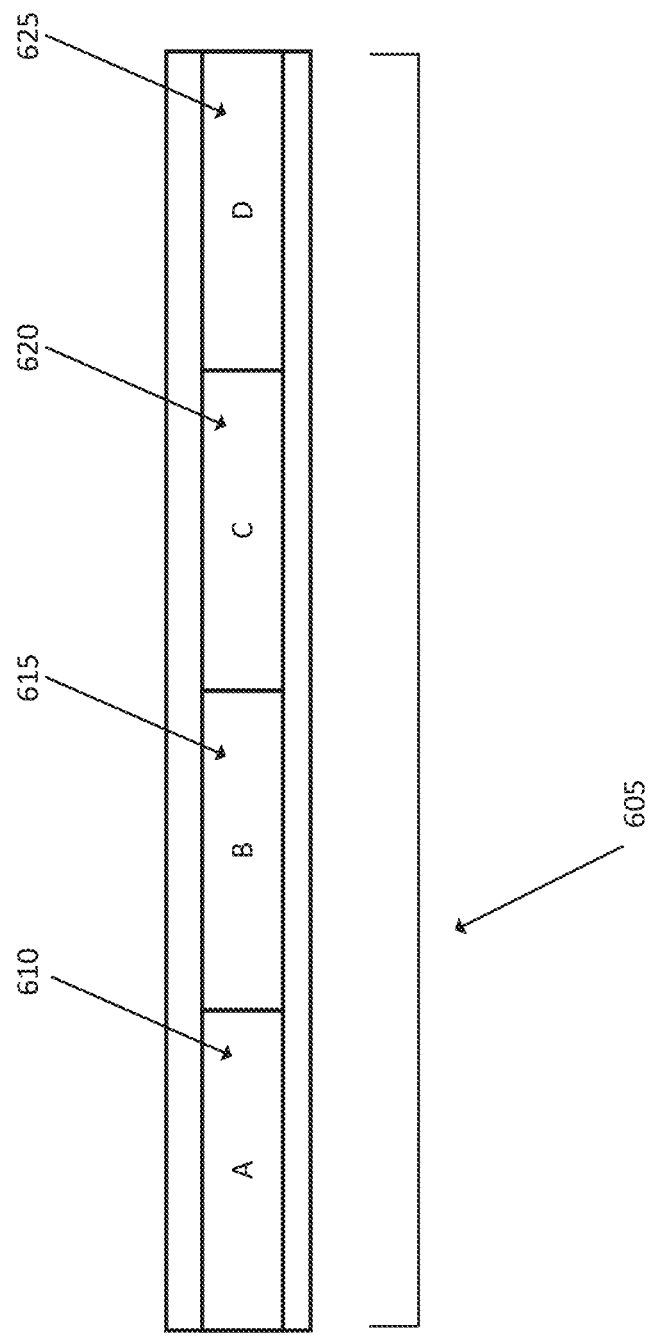
FIG. 6a may be an illustration of training data and testing data.

FIG. 6A may illustrate a sample artificial intelligence (AI) training data according to one or more embodiments. As an example and not a limitation, an artificial intelligence system may trained by analyzing a set of training data 605. The training data may be broken into sets, such as set A 610, set B 615, set C 620 and set D 625. As illustrated in FIG. 6B, one set may be using as a testing set (say set D 625) and the remaining sets may be used as training set (set A 610, set B 615 and set C 620). The artificial intelligence system may analyze the training set (set A 610, set B 615 and set C 620) and use the testing set (set D 625) to test the model create from the training data. Then the data sets may shift as illustrated in FIG. 6C, where the test data set may be added to the training data sets (say set A 610, set B 615 and set D 625) and one of the training data sets that have not been used to test before (say set C 620) may be used as the test data set. The analysis of the training data (set A 610, set B 615 and set D 625) may occur again with the new testing set (set C 620) being used to test the model and the model may be refined. The rotation of data sets may occur repeatedly until all the data sets have been used as the test data sets. The model then may be considered complete and the model may then be used on additional data sets.

In the specific case, past charges and disputes may be analyzed regarding which situations were actual trips and which were false positives. Artificial intelligence may be used to help identity which situations may need special care when receiving communications based on past experience. Further additional steps may be identified from past experiences which may be useful in eliminating problems in the future.

Figure 7:
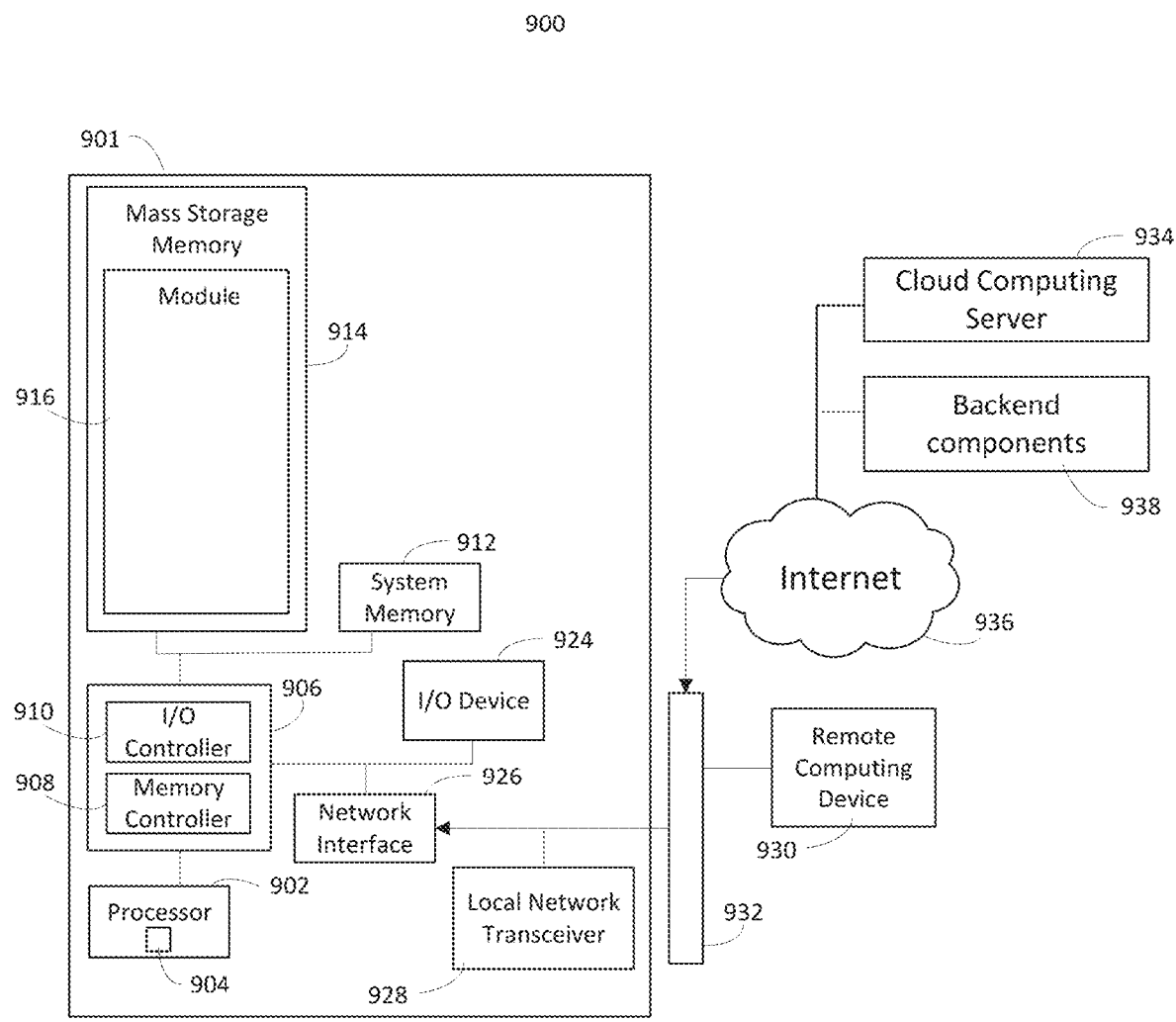
FIG. 7 may be a detailed view of the elements of a computer used in the system.

As illustrated in FIG. 1, many computers may be used by the system. FIG. 7 may illustrate a sample computing device 901. The computing device 901 includes a processor 902 that is coupled to an interconnection bus. The processor 902 includes a register set or register space 904, which is depicted in FIG. 7 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 7, the computing device 901 may be a multi-processor device and, thus, may include one or more additional processors that are identical or similar to the processor 902 and that are communicatively coupled to the interconnection bus.

The processor 902 of FIG. 7 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 7 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of providing payment to a mobile merchant from a user comprising:
   receiving a signal from a mobile computing device registered to the user by a communication system operating a geo-fenced area in the mobile merchant;
   in response to the signal from the mobile computing device registered to the user:
      dynamically determining, at a machine learning engine that is remote from the communication system and the mobile computing device, transaction analysis data from the signal,
      determining, by the machine learning engine, that the transaction analysis data corresponds to the mobile merchant based on historical fraud information on the mobile merchant,
      accessing, by a fraud API of the communication system, the machine learning engine, and
      configuring, by the fraud API of the communication system, a fraud graphical interface of the communication system to present and apply the transaction analysis data to a service of traveling from a first location to a second location via the mobile merchant;
   requesting, by the communication system, a first GPS signal including the first location and a first time, the first location representing a first site that the mobile computing device registered to the user communicated the signal to the communication system operating the geo-fenced area in the mobile merchant at the first time;
   determining, by the communication system, that communication of the signal between the mobile computing device registered to the user and the communication system operating the geo-fenced area has stopped;
   in response to determining that communication between the mobile computing device registered to the user and the communication system operating the geo-fenced area has stopped, requesting, by the communication system, a second GPS signal including the second location and a second time, the second location representing a second site where wireless communication of the signal between the mobile computing device registered to the user and the communication system operating the geo-fenced area in the mobile merchant ended at the second time;

determining, at a merchant server, a price for the service of traveling from the first location to the second location; and in response to the first location being substantially similar to a third location and the second location being substantially similar to a fourth location, sending, to the merchant server, an approval of the price for traveling from the first location to the second location for an account of the user, wherein the third location represents a third site of the mobile computing device registered to the user at the first time, and wherein the fourth location represents a fourth site of the mobile computing device registered to the user at the second time.

2. The method of claim 1, further comprising wherein the first time comprises when the wireless communication begins between the mobile computing device registered to the user and the communication system operating the geo-fenced area on the mobile merchant; and wherein the second time comprises when wireless communication ends between the mobile computing device registered to the user and the communication system operating the geo-fenced area.

3. The method of claim 2, further comprising:

determining a mobile merchant first velocity of the mobile merchant at the first time;

determining a mobile computing device first velocity at the first time;

determining a mobile merchant second velocity of the mobile merchant at the second time;

determining a mobile computing device second velocity at the second time;

comparing the mobile merchant first velocity to the mobile computing device first velocity;

comparing the mobile merchant second velocity to the mobile computing device second velocity;

in response to the mobile merchant first velocity in comparison to the mobile computing device first velocity being below a first threshold and the mobile merchant second velocity in comparison to the mobile computing device second velocity being below a second threshold, charging the user the determined price.

4. The method of claim 1, further comprising communicating a receipt to the user when the account has been charged the determined price.

5. The method of claim 1, further comprising alerting an authority when the user does not have the mobile computing device and has entered the geo-fenced area, traveled with the mobile merchant and has left the geo-fenced area.

6. The method of claim 1, wherein the account is a payment account separate from the mobile merchant.

7. The method of claim 2, wherein the price is determined based on the first time and the second time.

8. The method of claim 7, where the price is further determined based on a level of demand during a time period between the first time and the second time.

9. A computer system comprising at least one processor and at least one memory, wherein the processor is physically configured according to computer executable instructions for:

receiving a signal from a mobile computing device registered to the user by a communication system operating a geo-fenced area in the mobile merchant;

in response to the signal from the mobile computing device registered to the user:

dynamically determining, at a machine learning engine that is remote from the communication system and the mobile computing device, transaction analysis data from the signal, determining, by the machine learning engine, that the transaction analysis data corresponds to the mobile merchant based on historical fraud information on the mobile merchant, accessing, by a fraud API of the communication system, the machine learning engine, and configuring, by the fraud API of the communication system, a fraud graphical interface of the communication system to present and apply the transaction analysis data to a service of traveling from a first location to a second location via the mobile merchant;

requesting, by the communication system, a first GPS signal including the first location representing a first site that the mobile computing device registered to the user communicated the signal to the communication system operating the geo-fenced area in a mobile merchant at the first time;

determining, by the communication system, that communication of the signal between the mobile computing device registered to a user and the communication system operating the geo-fenced area has stopped;

in response to determining that communication between the mobile computing device registered to the user and the communication system operating the geo-fenced area has stopped, requesting, by the communication system, a second GPS signal including the second location and a second time, the second location representing a second site where wireless communication of the signal between the mobile computing device registered to the user and the communication system operating the geo-fenced area in the mobile merchant ended at the second time;

determining, at a merchant server, a price for the service of traveling from the first location to the second location; and in response to the first location being substantially similar to a third location and the second location being substantially similar to a fourth location, sending, to the merchant server, an approval of the price for traveling from the first location to the second location for an account of the user, wherein the third location represents a third site of the mobile computing device registered to the user at the first time, and wherein the fourth location represents a fourth site of the mobile computing device registered to the user at the second time.

10. The computer system of claim 9, the processor being further physically configured according to computer executable instructions for:

wherein the first time comprises when the wireless communication begins between the mobile computing device registered to the user and the communication system operating the geo-fenced area on the mobile merchant; and wherein the second time comprises when wireless communication ends between the mobile computing device registered to the user and the communication system operating the geo-fenced area.

11. The computer system of claim 9, further comprising computer executable instruction for communicating a receipt to the user when the account has been charged.

12. The computer system of claim 9, further comprising computer executable instructions for alerting an authority when the user does not have the mobile computing device and has entered the geo-fenced area, traveled with the mobile merchant and has left the geo-fenced area.

13. The computer system of claim 9, wherein the account is a payment account separate from the mobile merchant.

14. The computer system of claim 13, wherein monetary value is transferred from the payment account to the mobile merchant.

\* \* \* \* \*